US008389085B2

(12) United States Patent
Yanagimachi (10) Patent No.: US 8,389,085 B2
(45) Date of Patent: Mar. 5, 2013

(54) PREFORM FOR STRETCH BLOW-MOLDED BOTTLE

(75) Inventor: Yukio Yanagimachi, Nagano-ken (JP)

(73) Assignee: A.K. Technical Laboratory, Inc., Nagano-Ken (JP)

( * ) Notice: Subject to any disclaimer, the term of this patent is extended or adjusted under 35 U.S.C. 154(b) by 379 days.

(21) Appl. No.: 12/816,595

(22) Filed: Jun. 16, 2010

(65) Prior Publication Data

US 2010/0323136 A1    Dec. 23, 2010

(30) Foreign Application Priority Data

Jun. 19, 2009    (JP) ................ 2009-146522

(51) Int. Cl.
*B32B 1/08*    (2006.01)
*B32B 23/00*    (2006.01)

(52) U.S. Cl. ............... 428/35.7; 428/34.1; 428/34.2; 428/35.9; 428/36.9

(58) Field of Classification Search ............ 428/34.1, 428/34.2, 35.7, 35.9, 36.9
See application file for complete search history.

(56) References Cited

U.S. PATENT DOCUMENTS 5,047,271 A    9/1991    Feddersen et al.
5,158,817 A    10/1992    Krishnakumar
5,364,585 A    11/1994    Takeuchi
5,888,598 A    3/1999    Brewster et al.

FOREIGN PATENT DOCUMENTS

| JP | 55146718 | 11/1980 |
|----|----------|---------|
| JP | 4027520 | 1/1992 |
| WO | WO 90/04543 | 5/1990 |
| WO | WO 97/32711 | 9/1997 |

*Primary Examiner* — Marc Patterson
(74) *Attorney, Agent, or Firm* — Preti Flaherty Beliveau & Pachios LLP (57) ABSTRACT

A preform having an inverted truncated conical bottom section is used. The inclined inner surface of a bottle bottom surface-forming portion of the bottom section is formed into a gently curved convex surface that extends from the lower portion of a bottle bottom edge-forming portion of the bottom section to a curved portion in the lower portion of the bottom section so that the thickness of the bottle bottom surface-forming portion is greater than the thickness of the barrel section of the preform and the thickness of the bottle bottom edge-forming portion. The increase in thickness of the bottom section improves the efficiency of stretching the bottom section, and the circumferential wall of the bottom section can thereby be efficiently stretched. This allows a reduction in weight (thickness) of the bottom surface section of a stretch blow molded bottle, and a reduction in weight of the bottle is thereby achieved.

5 Claims, 5 Drawing Sheets

PREFORM FOR STRETCH BLOW-MOLDED BOTTLE

BACKGROUND OF THE INVENTION

1. Field of the Invention

The present invention relates to a closed-end preform that is formed by injection molding of a plastic material, used to form a bottle by stretch blow molding without reheating, and can reduce the weight of the bottle.

2. Description of the Related Art

Examples of the stretch blow molding of plastic materials such as polyethylene terephthalate, polycarbonate, and the like into a bottle include: the cold parison method in which a closed-end preform is injection-molded in a mold, cooled, solidified, and released from the mold, and then reheated to a molding temperature, before it is stretch blow molded into a bottle; and the hot parison method in which a preform in a high-temperature state with its inside not completely cooled and having high internal heat is released from a mold and then stretch blow molded into a bottle while the high-temperature state is maintained (U.S. Pat. No. 5,364,585).

In the hot parison method, the amount of internal heat contained in each part of the preform is proportional to its thickness. Therefore, the greater the thickness is, the larger the amount of internal heat is contained and the easier the stretching can be carried out. As the thickness is reduced by stretching, the surface area increases. Then the temperature in the stretched portion is reduced, and the stretched portion resists stretching. Therefore, stretching then occurs in the adjacent portion having a greater thickness with a higher temperature. The thickness becomes uniform during stretching, and this may be a result of the alternate stretching described above.

Generally, a preform is provided with a draft angle that facilitates release from a mold, and the draft angle is designed such that the thickness of the barrel section of the preform gradually decreases toward the bottom. Therefore, during axial stretching by the extension of a stretching rod, the central portion of the barrel section tends to be stretched first because the central portion has a large amount of internal heat and a stretching force is easily applied thereto, and the bottom section is stretched after some delay.

Since the bottom section is stretched after some delay, it is not sufficiently stretched after the stretching rod reaches the bottom of the mold, and the thickness of the bottom section tends to be greater than that of the barrel section, although it depends on the percent of stretch in the axial (vertical) direction. Therefore, the amount of resin remaining in the bottom section is greater than the amount necessary to form the bottom surface section of a bottle. The barrel section tends to be thin because the amount of stretching increases due to the delay of the stretching of the bottom section. In consideration of this increase, the amount of the resin is slightly increased in some cases.

The barrel section is horizontally stretched and enlarged by the pressure of air that is blown inside the preform from its upper portion with some delay after the extension of the stretching rod. More specifically, the upper portion of the barrel section is first expanded, and the lower portion is then expanded so as to follow the stretched thin portion. The barrel section is thereby stretched horizontally and reduced in thickness, so that the expanded barrel section of the bottle is formed. The bottom section is finally stretched and reduced in thickness, and the bottom surface section of the bottle is thereby formed. However, the bottom surface section of the bottle has a large thickness due to the excess resin.

Attempts have been made to reduce the thickness of the thick bottom surface section of the bottle to reduce its weight. For example, a preform for a bottle having a cylindrical barrel section and a circular bottom section can be designed to have a shape that allows its neck section and barrel section to be easily reduced in thickness. However, it is not easy to reduce the thickness of the bottom section to the extent that contributes to the reduction in weight of the bottom surface section of the bottle. This is because a whitening phenomenon occurs in the central portion of the bottom section due to an increase in the injection pressure and the flow orientation and because the amount of internal heat is reduced to cause difficulty in stretching.

The reason that the bottom surface section of the bottle formed by stretch blow molding of the preform is thicker than the barrel section is insufficient stretching in the axial direction caused by internal temperature difference due to the thickness distribution and by the delay of stretching in the bottom section. Therefore, if the bottom section has a thickness greater than that of the barrel section so that the amount of internal heat in the bottom section is increased, the stretching of the bottom section is facilitated. In this case, the stretching of the bottom section can take place at an earlier time, and the amount of remaining resin due to the delay of stretching is reduced, so that a reduction in thickness may be achieved.

However, to form a preform such that the bottom section is thicker than the barrel section, an undercut must be provided in the bottom section of the mold structure, and the preform cannot be released from the cavity of such a mold and a core mold by drawing. Therefore, new devices must be used to increase the thickness of the bottom section of a preform.

The problem of the undercut due to the increase in thickness of the bottom section of a preform can be solved by the method disclosed in Japanese Patent Application Laid-Open No. Sho 55-146718. More specifically, a preform is formed such that its bottom section has an inverted truncated conical shape. In this shape, the circumferential wall of the bottom section is inclined, and the inner surface of the bottom section faces upward. However, in the inclined circumferential wall of the bottom section formed by bending the lower portion of the barrel section, the thickness of the circumferential wall around the inflection point between the circumferential wall and the barrel section is less than the thickness of the barrel section even though the circumferential wall is bent inwardly.

In addition, in the preform having an inverted truncated conical bottom section, the stretching stress tends to be concentrated on the bent portion between the lower portion of the barrel section and the circumferential wall, and the thickness (internal temperature) of the barrel section differs from that of the circumferential wall of the bottom section. Therefore, stretching first occurs on the barrel side of the bent portion, and the stretching force acting on the circumferential wall is thereby reduced. Accordingly, the bottom section is not stretched as effectively as expected. Moreover, another problem arises in that the thickness of the outer circumference of the bottom edge of the formed bottle can be non-uniform due to the reduction in thickness of the bent portion by stretching.

SUMMARY OF THE INVENTION

An object of the present invention is to provide a novel preform for a stretch blow-molded bottle. With the novel preform, the efficiency of stretching the bottom section of the preform can be improved by increasing the thickness of the bottom section, and the weight (thickness) of the bottom surface section of the bottle can be reduced by effectively stretching the circumferential wall of the bottom section, whereby a reduction in weight of the bottle is achieved. In addition, the undercut problem caused by the increase in the thickness of the bottom section of the preform is solved by using an inverted truncated conical bottom section, and the reduction in thickness of the bottom section caused by excessive stretching of the bent portion when the inverted truncated conical bottom section is used can be prevented.

To achieve the above object, the present invention provides a preform for a plastic bottle produced by injection stretch blow molding. The preform includes: a cylindrical barrel section; a neck section continuous with an upper portion of the barrel section; and a bottom section continuous with a lower portion of the barrel section, wherein the bottom section has an inverted truncated conical shape and includes:

a flat bottom surface central portion having a diameter d less than an inner diameter D of a central portion of the barrel section and a thickness $t_2$ less than a thickness $t_1$ of the barrel section, a bottle bottom surface-forming portion formed by bending, at a height position h, a portion that forms a bottom edge of the bottle and is continuous with the lower portion of the barrel section, the bottle bottom surface-forming portion being inclined toward and extending to a circumference of the bottom surface central portion, the bottle bottom surface-forming portion including a bottle bottom edge-forming portion as an upper portion of the bottle bottom surface-forming portion and continuous with the lower portion of the barrel section, and a curved portion interposed between a lower portion of the bottle bottom surface-forming portion and the bottom surface central portion, wherein an inner surface of the bottle bottom surface-forming portion is formed as a gently curved convex surface extending from a lower portion of the bottle bottom edge-forming portion to an upper portion of the curved portion such that a thickness $t_3$ of the bottle bottom surface-forming portion is increased to be greater than the thickness $t_1$ of the barrel section, and wherein the bottle bottom edge-forming portion is formed to have a thickness $t_4$ less than the thickness $t_3$ of the bottle bottom surface-forming portion.

An amount $t_3'$ of increase in thickness of the bottle bottom surface-forming portion by the curved convex surface may be equal to or less than 15% of the thickness $t_1$ of the barrel section. The thickness $t_2$ of the bottom surface central portion may be at least 1.5 mm at which whitening of the bottom surface section due to flow orientation of resin is prevented, and the diameter d of the bottom surface central portion may be set based on one-half of the inner diameter D of the central portion of the barrel section.

The height position h of the bottom section may be set based on an outer diameter of the barrel section, the thickness $t_1$ of the barrel section, a weight of a bottom surface section of the bottle, and a diameter D" of the bottom surface section of the bottle, the weight of the bottom surface section of the bottle being defined as a product of an area of the bottom surface section, a thickness of the bottom surface section, and a specific gravity of a material for the bottle. An inclination angle θ of the bottle bottom surface-forming portion may be set based on the height position h and the diameter d of the bottom surface central portion. The bottle bottom edge-forming portion has a vertical width ha, and the vertical width ha may be adjusted based on the thickness $t_4$ thereof.

In the preform having the above configuration, the inner surface of the bottle bottom surface-forming portion is inclined and faces upward. Therefore, although this inner surface is formed as a gently curved convex surface such that the thickness of the bottle bottom surface-forming portion is greater than the thickness of the barrel section, an undercut is not formed, so that the preform can be easily released from the mold. The bottle bottom surface-forming portion having a thickness greater than the barrel section is more easily stretched in the axial direction than the barrel section because of the difference in internal temperature caused by the difference in thickness. Therefore, excess resin, which is caused by the delay of stretching (i.e., the stretching of the bottom section after the stretching of the barrel section), does not remain. The bottom surface section of the bottle can thereby have a small thickness. This results in a reduction in the weight of the bottom surface section of the bottle, so that the weight of the bottle can be reduced.

The thickness of the bottle bottom surface-forming portion disposed on the lower side of the bottle bottom edge-forming portion is increased so as to be greater than the thickness of the bottle bottom edge-forming portion. In this manner, the bottle bottom edge-forming portion is stretched in the axial direction with some delay after the bottle bottom surface-forming portion is stretched. Therefore, the bottom edge of the bottle can have a sufficient thickness, and the instability of the bottle that occurs when the bottom edge of the bottle is damaged is prevented. The bottle can thereby have good durability although the weight of the bottle is reduced by reducing the thickness of its bottom surface section.

DETAILED DESCRIPTION OF THE PREFERRED EMBODIMENT

In the drawings, reference numeral 1 represents a preform for a plastic bottle. The preform 1 includes a cylindrical barrel section 11, a neck section 12 continuous with the upper portion of the barrel section 11, and a bottom section 13 continuous with the lower portion of the barrel section 11, and these sections are formed integrally by injection molding.

The barrel section 11 of the preform 1 is provided with a draft angle, as in a general preform. The thickness $t_1$ of the barrel section 11 slightly decreases toward the lower portion, and the inner diameter also decreases slightly according to the draft angle.

Figure 1:
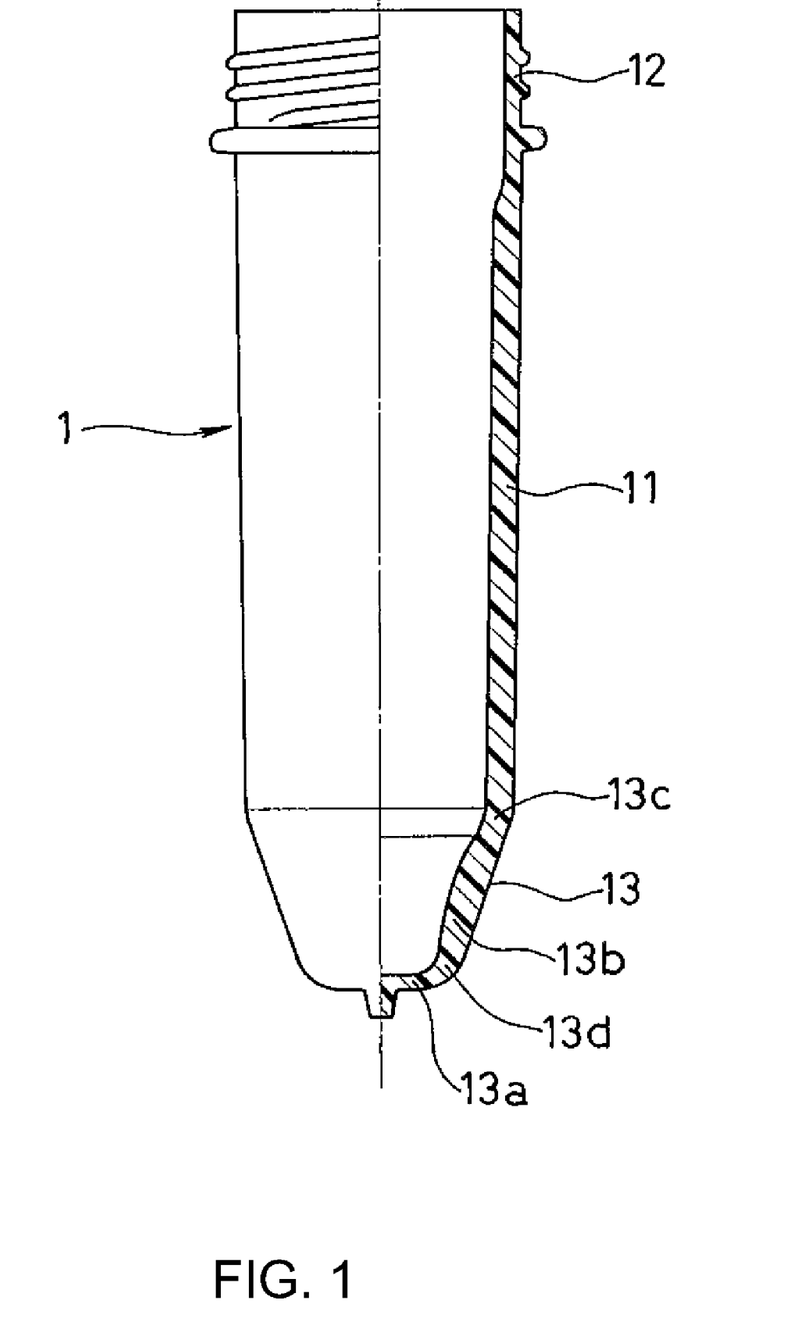
FIG. 1 is a vertical front cross-sectional view of a preform for a light-weight bottle according to the present invention.
Figure 2:
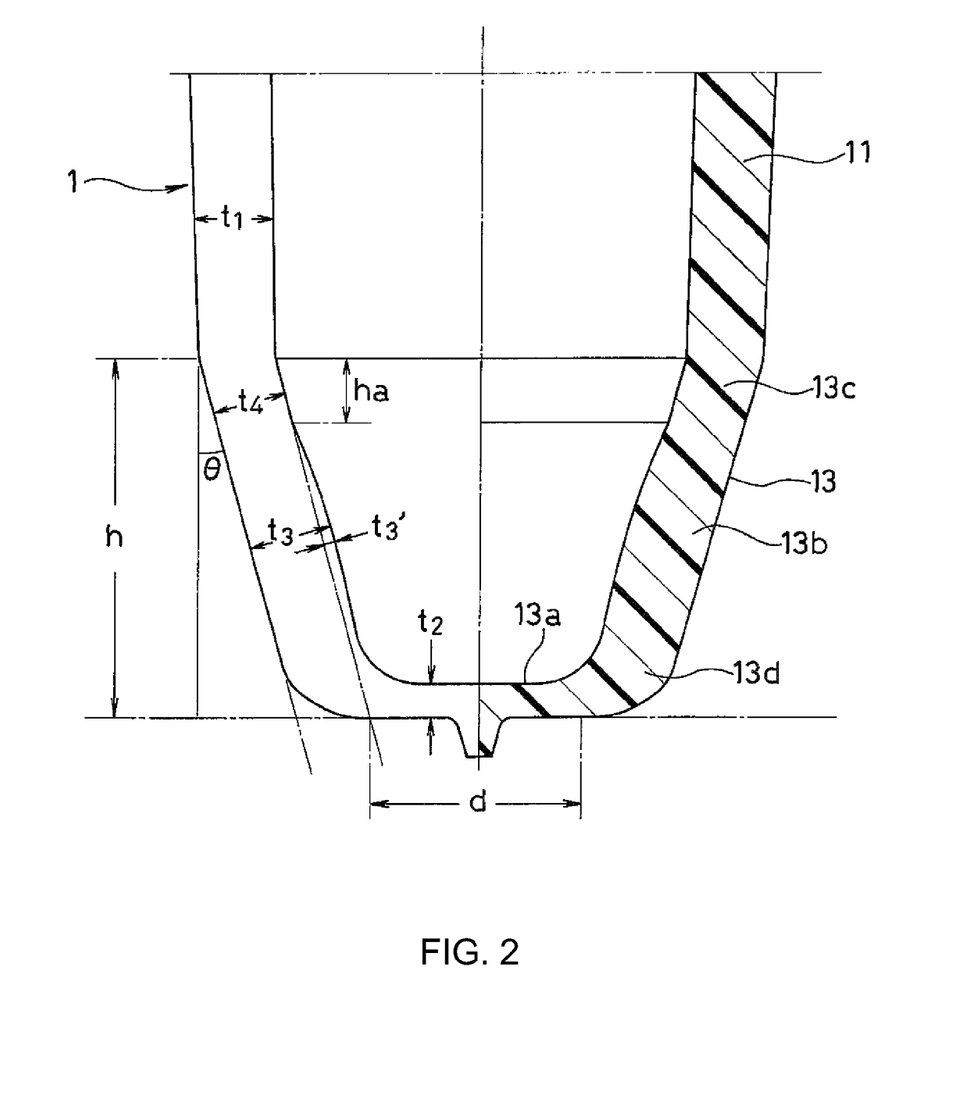
FIG. 2 is a vertical front cross-sectional view of the bottom section of the perform.

The bottom section 13 has an inverted truncated conical shape and includes: a flat bottom surface central portion 13a having a diameter d less than the inner diameter D of the central portion of the barrel section 11 and a thickness $t_2$ less than the thickness $t_1$ of the central portion of the barrel section 11; a bottle bottom surface-forming portion (a bottom portion of the preform) 13b formed by bending, at a height position h, a portion that forms the bottom edge of the bottle and is continuous with the lower portion of the barrel section 11, the bottle bottom surface-forming portion 13b being inclined toward and extending to the circumference of the central bottom portion 13a, the bottle bottom surface-forming portion including a bottle bottom edge-forming portion 13c as the upper portion of the bottle bottom surface-forming portion 13b and continuous with the lower portion of the barrel section 11; and a curved portion 13d interposed between the lower portion of the bottle bottom surface-forming portion 13b and the bottom surface central section 13a.

The bottle bottom surface-forming portion 13b is formed by bending the bottom section 13 at a height position h, and the inner and outer surfaces of the bottom section 13 are inclined at the same angle toward the circumference of the bottom surface central section 13a. Therefore, generally, the thickness of the bottom section 13 below the bent portion decreases and is less than the thickness $t_1$ of the barrel section 11. The amount of the decrease is proportional to the inclination angle θ. However, the inclined inner surface (excluding the inner surface of the bottom edge-forming portion 13c) extending to the curved portion 13d is formed as a curved convex surface to increase the thickness inwardly. Therefore, the thickness $t_3$ of the bottle bottom surface-forming portion 13b is greater than the thickness $t_1$ of the barrel section 11.

The curved convex surface of the inclined inner surface does not form an undercut during releasing from the mold after the lower end portion of the curved convex surface is molded. When a step is present in the upper end portion and the thickness is steeply changed at the step, a portion around the step is not sufficiently stretched and remains as a thick portion in the bottom edge of a stretch blow-molded bottle. Therefore, the inclined inner surface is formed as a gently curved convex surface without steps at the upper and lower end portions, as shown in the figure.

The increased thickness $t_3'$ on the inner side of the curved convex surface is limited so as not to exceed 15% of the thickness $t_1$ of the barrel section 11. When the increased thickness $t_3'$ is greater than 15%, the amount of internal heat that is proportional to the thickness is much greater in the bottle bottom surface-forming portion 13b than in the barrel section 11. In such a case, the bottle bottom surface-forming portion 13b tends to be stretched excessively, and the thickness of the bottom section of the bottle is reduced more than necessary. In addition, the stretched length of the barrel section 11 before the bottom surface central section 13a reaches the bottom surface of the mold (not shown) (the bottom surface of the bottle) is reduced. Therefore, unfortunately, the barrel section 11 is not stretched sufficiently, and the thickness of the barrel section is likely to be non-uniform.

Since the thickness of the bottle bottom surface-forming portion 13b is increased, the thickness $t_4$ of the bottle bottom edge-forming portion 13c continuous with the lower portion of the barrel section 11 is less than the thickness of the bottle bottom surface-forming portion 13b and is also less than the thickness $t_1$ of the barrel section 11.

Preferably, the thickness $t_2$ of the bottom surface central section 13a is limited to about 1.5 mm. At this thickness, a molten material injected from the sprue bush of the bottom cavity of an injection mold (not shown) is not whitened in the bottom section due to flow orientation. In addition, when a stretching rod (not shown) is extended to stretch the preform 1 in the axial direction (vertical direction), the stretching pusher provided at the end of the stretching rod does not break through the bottom surface central section 13a.

Preferably, to ensure an area that comes into contact with the stretching pusher, the diameter d of the bottom surface central section 13a is set to be slightly greater than a reference diameter defined as one-half of the inner diameter D of the central portion of the barrel section.

The height position h of the bottom section 13 can be set using the outer diameter and thickness $t_1$ of the barrel section 11, the weight of the bottom surface section of the bottle (the bottom surface area of the bottle×the thickness of the bottom surface section×the specific gravity of the used material), and the diameter of the bottom surface section of the bottle. The inclination angle θ of the bottle bottom surface-forming portion 13b can be set using the height position h and the diameter d of the bottom surface central section 13a. The vertical width ha of the bottom edge-forming portion 13c on the upper portion of the bottle bottom surface-forming portion 13b is adjusted based on the thickness $t_4$ of the bottom edge-forming portion 13c.

The preform 1 having the above configuration is stretch blow molded into a bottle 2 having a thin barrel section 21 and a thin bottom surface section 23 shown in FIG. 4 in the following manner. As in the general hot parison method, while the barrel section 11 and the bottom section 13 (excluding the neck section 12) are held in a high-temperature moldable state, the neck section 12 is secured to a blow-molding mold, and the barrel section 11 and the bottom section 13 are vertically stretched by the extension of a stretching rod (not shown) and horizontally stretched by air from the upper portion of the barrel section.

Figure 3:
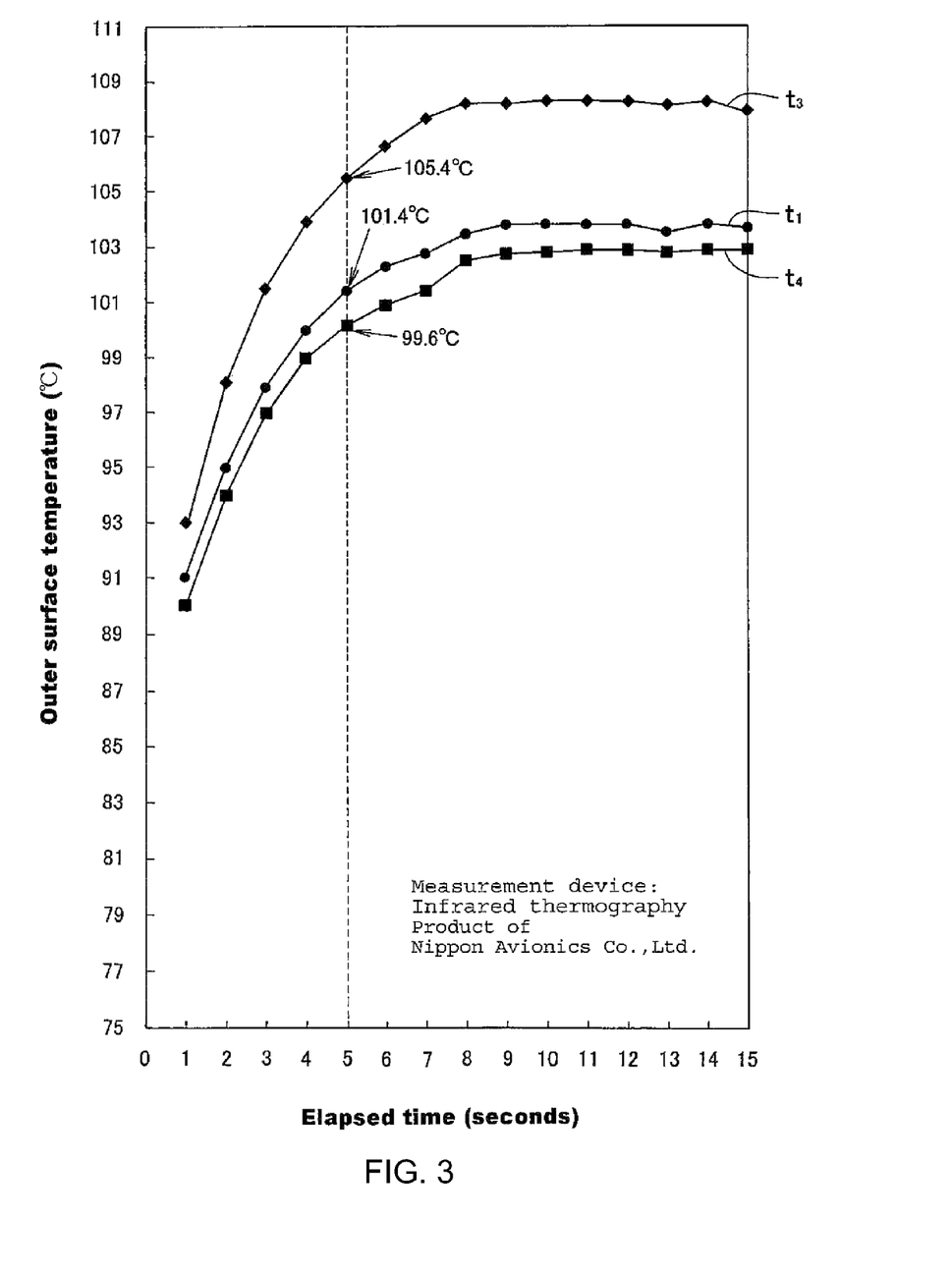
FIG. 3 is a graph showing the temperature of the outer surface of the preform after it is released from a mold.

FIG. 3 is a graph of the temperature of the outer surface of a preform having a thickness distribution later described in an Example. The temperature measurement was started one second after the preform was released from a mold. Although the amount of internal heat in the preform cannot be measured, the outer surface temperature is the temperature of the surface heated by the internal heat. Therefore, the outer surface temperature was used to set the time (5 seconds) until stretch blow molding was started after releasing from the mold.

In the preform 1 having the above configuration, the bottom section 13 is first stretched in the axial direction. This is because the thickness of the bottle bottom surface-forming portion 13b is greater than the thickness of the barrel section 11 and therefore the amount of internal heat in the bottle bottom surface-forming portion 13b is greater than that in the barrel section 11. During stretching, the thickness of the bottle bottom surface-forming portion 13b is reduced, so that the amount of internal heat therein is reduced. Therefore, stretching resistance is generated in the bottle bottom surface-forming portion 13b, and the barrel section 11 at a higher temperature is then stretched. Since a similar phenomenon occurs in the barrel section 11, the bottom section 13 and the barrel section 11 are sequentially stretched until the bottom section 13 reaches the bottom surface of the mold. This may eliminates the delay of the stretching of the bottom section 13 and may reduce the amount of excessive resin. Therefore, the reduction in the thickness of the bottom section 13 due to axial stretching occurs uniformly.

In the bottom section 13, the thickness $t_4$ of the bottom edge-forming portion 13c is less than those of the bottle bottom surface-forming portion 13b and the barrel section 11, and the bottom edge-forming portion 13c is thereby less stretched. Therefore, although the bottom edge-forming portion 13c is disposed in an area in contact with the bent portion on which the stretching stress tends to be concentrated, the bottle bottom surface-forming portion 13b is first stretched, and then the bottom edge-forming portion 13c is stretched after the bottle bottom surface-forming portion 13b is reduced in thickness and temperature to some extent. Since the bottom edge-forming portion 13c is not drawn toward the barrel section and not reduced in thickness excessively, the thickness suitable for the formation of a bottom edge 23a of the bottle by air blow is maintained. The bottom surface central section 13a having the smallest thickness and temperature resists stretching in the axial direction. In the final stage of axial stretching, the bottom surface central section 13a with the sprue on its outer bottom surface is compressed against the bottom surface of the mold by the stretching rod and thereby reduced in thickness.

As in the conventional methods, the preform 1 is stretched in the horizontal direction by air blow with slight delay so as to follow the axial stretching. In this manner, the upper portion of the axially stretched barrel section 11 is first expanded horizontally and reduced in thickness by the air blow, and the bottom section 13 is successively expanded horizontally and reduced in thickness. In the bottom section 13, the thick bottle bottom surface-forming portion 13b is stretched to have a thickness corresponding to the ratio of axial stretching until the bottom surface central section 13a comes in contact with the bottom surface of the mold (not shown).

Figure 4:
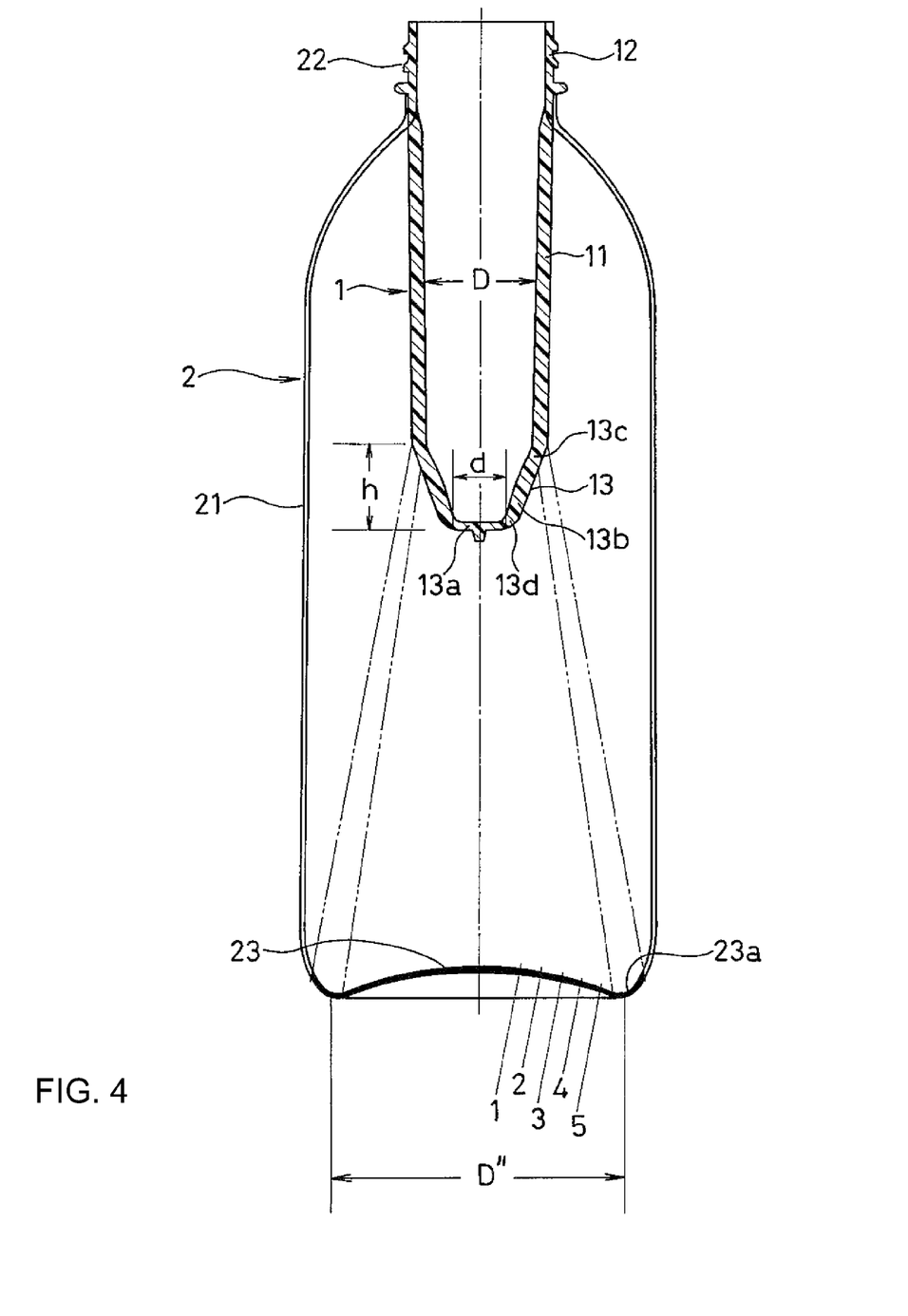
FIG. 4 is a diagram illustrating the correspondence between the preform according to the present invention having an inverted truncated conical bottom section and a stretch blow-molded bottle with a circular barrel.

FIG. 4 is a diagram illustrating the correspondence between the preform 1 and the bottle 2 having a circular barrel and a flat bottom. The barrel section 21 of the bottle 2 is formed from the barrel section 11 of the preform 1, and a neck section 22 is formed from the neck section 12 of the preform 1. The bottom surface section 23 of the bottle is formed by stretching and expanding the bottom section 13 below the height position h, and the bottom edge (bottom rim) 23a of the bottle is formed from the bottle bottom edge-forming portion 13c at the height position h.

Figure 5:
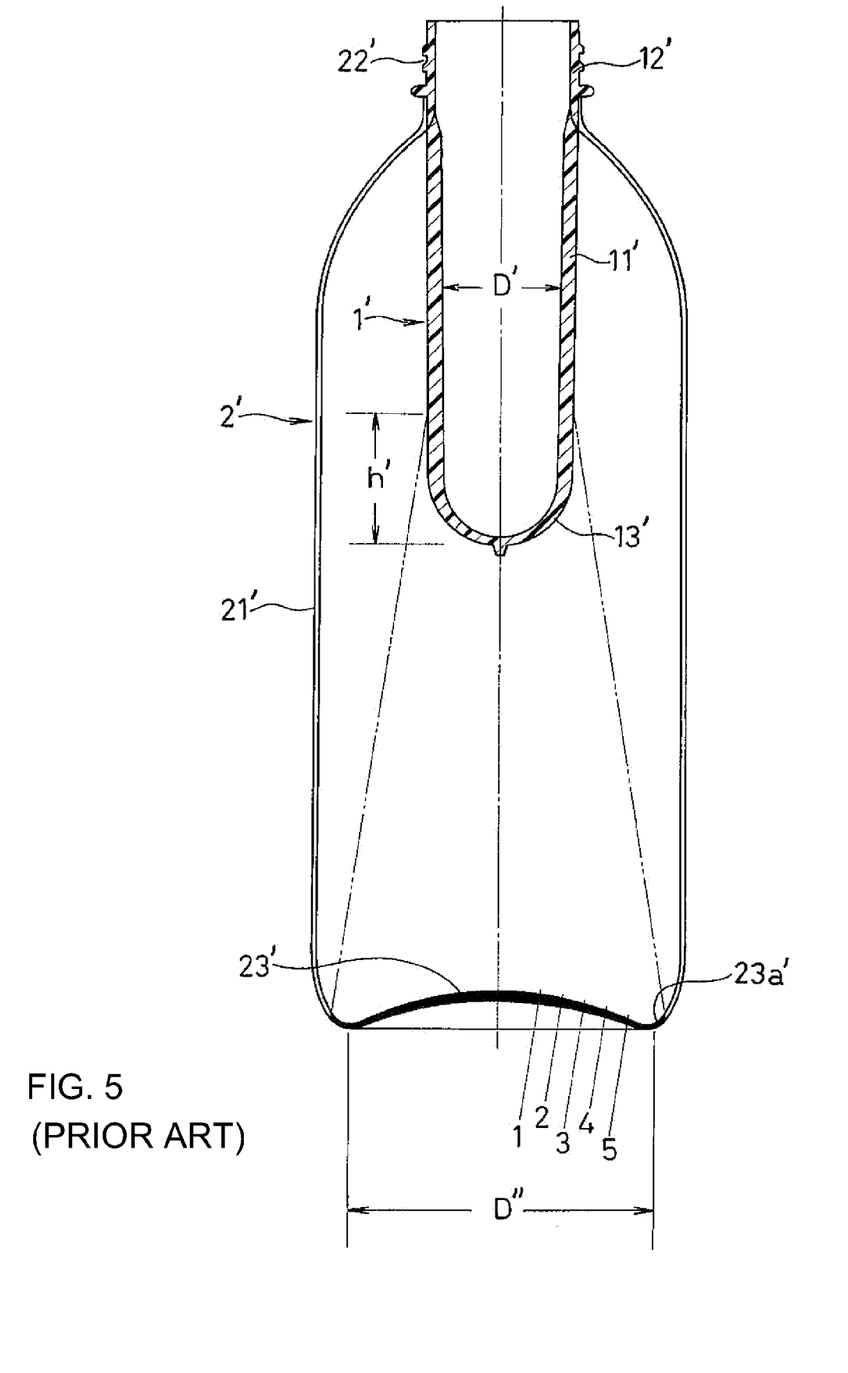
FIG. 5 is a diagram illustrating the correspondence between a conventional preform having a circular bottom section and a stretch blow-molded bottle with a circular barrel.

FIG. 5 is diagram illustrating the correspondence between a conventional circular bottom preform 1' and a bottle 2', which is the same as the bottle 2 shown in FIG. 4. The bottom section 13' of the preform 1' that extends from the lower portion of the barrel section to the center of the bottom surface is formed to have a smaller thickness. The barrel section 21' of the bottle 2' is formed from the barrel section 11' of the preform 1', and the neck section 22' of the bottle 2' is formed from the neck section 12' of the preform 1'. The bottom surface section 23' of the bottle is formed by stretching and expanding the bottom section 13' below the height position h', and the bottom edge (bottom rim) 23a' of the bottle is formed from a portion of the preform 2' at the height position h'.

Example

Preform (Resin Material: Polyethylene Terephthalate, Weight: 50 g)

Thickness (Set Values)

| | |
|---|---|
| Central portion of barrel section ($t_1$) | 3.55 mm |
| Bottom surface central portion ($t_2$) | 1.72 mm |
| Bottle bottom surface-forming portion ($t_3$) | 3.85 mm |
| Bottle bottom edge-forming portion ($t_4$) | 3.45 mm |
| Height: | |
| Barrel section | 82 mm |
| Bottom section (h) | 18 mm |

Diameter

| | |
|---|---|
| Inner diameter of central portion of barrel section (D) | 27.2 mm |
| Bottom surface central portion (d) | 15.7 mm |
| Inclination angle of bottom section (θ) | 11.8° |

Stretch Blow Molding Temperature (Temperature (° C.) of Outer Surface 5 Seconds after Removal from Mold)

| | |
|---|---|
| Central portion of barrel section ($t_1$) | 101.4 |
| Bottle bottom surface-forming portion ($t_3$) | 105.4 |
| Bottle bottom edge-forming portion ($t_4$) | 99.6 |

Comparative Example

Preform (Resin Material: Polyethylene Terephthalate, Weight: 50 g)

Thickness (Set Values)

| | |
|---|---|
| Central portion of barrel section | 3.55 mm |
| Bottle bottom surface-forming portion | 3.55 to 1.7 mm |
| Bottom surface central section | 1.7 mm |
| Height: barrel section (including bottom section) | 100 mm |
| Diameter: Inner diameter of central portion of barrel section (D') | 27.2 mm |
| Height of portion forming bottom surface of bottle (h') | 23.5 mm |

Injection Molding Conditions (Common)

| | |
|---|---|
| Injection molding temperature | 270° C. |
| Mold cooling temperature | 15° C. |
| Cooling time | 5.8 seconds |

Stretch Blow Molding Conditions (Common)

| | |
|---|---|
| Time after releasing from mold | 5.0 seconds |
| Percent of stretching (vertical) | 213 |
| Percent of stretching (horizontal) | 249 |

Molded Product (Bottle Having Circular Barrel and Flat Bottom: 1000 ml, 50 g)

| | |
|---|---|
| Height (excluding height of neck section) | 213 mm |
| Diameter of bottom surface section (D") | 72 mm |
| Area of bottom surface section | 4069 mm$^2$ |

Thickness Distribution On Bottom Surface Section Of Bottle (Measurement Points: Same Positions in FIGS. 4 and 5)

| Measurement point | Example (mm) | Comparative Example (mm) | Difference in thickness mm |
|---|---|---|---|
| 1 | 1.45 | 2.60 | 1.15 |
| 2 | 1.70 | 2.59 | 0.89 |
| 3 | 1.80 | 2.00 | 0.20 |
| 4 | 1.50 | 1.59 | 0.09 |
| 5 | 0.95 | 1.10 | 0.15 |

Weight of Bottom Surface Section of Bottle (g)
Example: 6.2, Comparative Example: 9.1, reduction ratio: 31.87%

Weight of Bottom Surface Section/Weight of Bottle (50 g) %

Example: 12.4, Comparative Example: 18.2, reduction ratio: 5.8

Results

As can be seen from the comparison between the Example and Comparative Example, the bottle formed by stretch blow molding of the preform of the present invention has a thinner bottom surface section than that of the bottle formed by stretch blow molding of the conventional preform, and the weight of the bottom surface section of the bottle is smaller in the invention. The weight corresponding to the reduction in thickness is distributed over the barrel section of the bottom, so the thickness of the barrel section is increased. Therefore, a preform having a weight reduced by the weight corresponding to the reduction in thickness can be stretch blow molded into a bottle similar to the above bottle. The weight of the bottle can be reduced accordingly.

Although the stretch blow molded bottle in the embodiment and the Example has a circular barrel and a flat bottom, the preform according to the present invention can be used as a preform for a rectangular or flat bottle. The shape of the bottom surface section of the bottle is not limited to the flat bottom shape shown in the figures, and the bottle can have a raised bottom.

What is claimed is:

1. A preform for a plastic bottle produced by injection stretch blow molding, the preform comprising:
    a barrel section;
    a neck section continuous with an upper portion of the barrel section; and
    a bottom section continuous with a lower portion of the barrel section,
    said bottom section includes:
        a flat bottom surface central portion having a diameter d less than an inner diameter D of the barrel section and a thickness $t_2$ less than a thickness $t_1$ of the barrel section,
        a bottle bottom surface-forming portion formed by bending, at a height position h, a portion that forms a bottom edge of the bottle, the bottle bottom surface-forming portion extending to a circumference of the bottom surface central portion and including a bottle bottom edge-forming portion, and
        a curved portion interposed between a lower portion of the bottle bottom surface-forming portion and the bottom surface central portion,
    wherein the bottom section has an inverted truncated conical shape, wherein the bottle bottom surface-forming portion is continuous with the lower portion of the barrel section and inclined toward the bottom surface central portion,
    the bottle bottom edge-forming portion is an upper portion of the bottle bottom surface-forming portion and is continuous with the lower portion of the barrel section,
    an inner surface of the bottle bottom surface-forming portion is formed as a gently curved convex surface extending from a lower portion of the bottle bottom edge-forming portion to an upper portion of the curved portion such that a thickness $t_3$ of the bottle bottom surface-forming portion is increased to be greater than the thickness $t_1$ of the barrel section, and
    wherein the bottle bottom edge-forming portion is formed to have a thickness $t_4$ less than the thickness $t_3$ of the bottle bottom surface-forming portion.

2. The preform for a plastic bottle produced by injection stretch blow molding according to claim 1, wherein an amount $t_3'$ of increase in thickness of the bottle bottom surface-forming portion by the curved convex surface is equal to or less than 15% of the thickness $t_1$ of the barrel section.

3. The preform for a plastic bottle produced by injection stretch blow molding according to claim 1, wherein: the thickness $t_2$ of the bottom surface central portion is at least 1.5 mm at which whitening of the bottom surface section due to flow orientation of resin is prevented; and the diameter d of the bottom surface central portion is set based on one-half of the inner diameter D of the central portion of the barrel section.

4. The preform for a plastic bottle produced by injection stretch blow molding according to claim 1, wherein: the height position h of the bottom section is set based on an outer diameter of the barrel section, the thickness $t_1$ of the barrel section, a weight of a bottom surface section of the bottle, and a diameter D" of the bottom surface section of the bottle, the weight of the bottom surface section of the bottle being defined as a product of an area of the bottom surface section, a thickness of the bottom surface section, and a specific gravity of a material for the bottle; and an inclination angle $\theta$ of the bottle bottom surface-forming portion is set based on the height position h and the diameter d of the bottom surface central portion.

5. The preform for a plastic bottle produced by injection stretch blow molding according to claim 4, wherein the bottle bottom edge-forming portion has a vertical width ha, and the vertical width ha is adjusted based on the thickness $t_4$ thereof.

* * * * *